United States Patent
Kerner et al.

[11] Patent Number: 5,897,155
[45] Date of Patent: *Apr. 27, 1999

[54] CENTER CONSOLE FOR A MOTOR VEHICLE

[75] Inventors: Wolfgang Kerner, Bondorf; Johann Seefried, Eutingen; Bernd Artner, Renningen, all of Germany

[73] Assignee: Mercedes-Benz AG, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/741,357

[22] Filed: Oct. 30, 1996

[30] Foreign Application Priority Data

Oct. 30, 1995 [DE] Germany .................. 195 40 399

[51] Int. Cl.⁶ .................................................. B60R 7/00
[52] U.S. Cl. ................................ 296/37.8; 296/188
[58] Field of Search ........................ 296/188, 37.8, 296/189, 68.1; 224/539

[56] References Cited

U.S. PATENT DOCUMENTS

| | | |
|---|---|---|
| 5,000,509 | 3/1991 | Sinnhuber et al. ............ 296/188 |
| 5,085,481 | 2/1992 | Fluharty et al. ............. 296/37.8 |
| 5,584,525 | 12/1996 | Nakano et al. ............ 296/188 X |

FOREIGN PATENT DOCUMENTS

| | | |
|---|---|---|
| 2581598 | 11/1986 | France . |
| 2816318C2 | 10/1978 | Germany . |
| 4207253A1 | 9/1992 | Germany . |
| B48-41863 U | 12/1973 | Japan . |
| A55-4980 U | 1/1980 | Japan . |
| A57-168434 U | 10/1982 | Japan . |
| A58-160832 U | 10/1983 | Japan . |
| A61-64552 | 4/1986 | Japan . |
| A62-210151 | 9/1987 | Japan . |

OTHER PUBLICATIONS

Office Action, dated Dec. 19, 1997 (English translation).
Patent Abstracts of Japan, Body Structure of Automobile, 62–210151(A), Sep. 16, 1987, App. No. 61–53950, Mazda Motor Corp.

*Primary Examiner*—Joseph D. Pape
*Attorney, Agent, or Firm*—Evenson McKeown Edwards & Lenahan, PLLC

[57] ABSTRACT

A center console is raised to form a built-in box-shaped part between the backs of passenger vehicle front seats, this box shaped part serving to receive built-in devices that can be operated from the rear seats. This raised area is configured as a supporting element between backs of the front seats in such fashion that the side walls are reinforced with light-weight metal shells connected with one another by cross braces.

21 Claims, 3 Drawing Sheets

CENTER CONSOLE FOR A MOTOR VEHICLE

BACKGROUND AND SUMMARY OF THE INVENTION

The invention relates to a center console for a motor vehicle, especially an automobile, said console having a raised area in the shape of a box between the backs of the front seats to accommodate built-in modules associated with the rear seats, with the lateral areas of the seat backs being located only a short distance from the side walls of said modules.

A center console of this type is known from the French Utility Model with Publication Number 25 81 598. In that document, the space between the front seats has been used to provide a sort of built-in cabinet as an extension of the console, in which air nozzles for cooling the passengers seated in the rear, loudspeakers, a radio or telephone, and operating elements for locking the doors for example are incorporated, said devices being operable by the rear-seat passengers since they are located in the rear wall facing the rear seats.

On the other hand, it is known to provide protective measures to protect vehicle occupants in rear-end collisions as well as in the event of lateral impacts, said measures consisting for example in a reinforcement of the doors or also (German Patent Document DE 42 07 253 A1) in the provision of a gas bag inflatable between the occupants upon impact.

An object of the present invention is to improve the safety of the vehicle occupants in the event of a lateral impact without costly additional measures being required.

Taking its departure from the knowledge that center consoles of the species recited at the outset can be used to reinforce the seat back areas of the front seats against lateral compression, the invention recognizes that the side walls of the box-shaped area can be reinforced and connected together by cross braces to create a protective element that effectively supports the seat backs of the front seats in the event of a lateral impact on the vehicle.

In especially preferred embodiments of the invention, provision is made such that the side walls of the box-shaped area are reinforced with lightweight metal shells in the adjusting area of the seat back bracing. These shells in turn can be made slightly convex to protect them against bending and be provided on their inwardly directed surfaces with reinforcing ribs. These lightweight metal shells can be injected into the impact resistant plastic of the console.

In especially preferred embodiments of the invention, the cross braces between the lightweight metal shells that reinforce the side walls are arranged so that they are located in the parting planes of the storage areas located in the center console, in other words, for example, in the separating area between the central storage compartment, like that already known, and between the storage compartments accessible from the rear, into which the modular additional devices mentioned at the outset can be inserted.

In especially preferred embodiments of the invention, the central storage compartment is also designed so that it is surrounded laterally by hollow spaces. If the hollow spaces extend into the box-shaped area between the seat backs, the stability and supporting effect of the center console can be increased as a result. In an improvement on the invention, however, these hollow spaces can also be designed as air ducts to supply a discharge nozzle located in the box-shaped area, said provision being accomplished by simply closing off the hollow spaces, initially open at the bottom, by a foam body inserted from below. In this design it is also possible to shape the inserted foam bodies as deflecting walls for guiding the air so that the air is guided upward in the vicinity of the box-shaped area to the air outlet nozzle that is also located in the upper area.

In especially preferred embodiments of the invention, the walls of the hollow spaces that face the central storage compartment can be provided with a window so that it is also possible to conduct cooled air flowing past, laterally through the air ducts for example, into the storage compartment as well in order to air-condition the latter.

In one especially advantageous improvement according to preferred embodiments of the invention, in a vehicle with a center tunnel, provision is made such that the side walls provided with lightweight metal shells can project downward beyond the box-shaped area of the console and be connected permanently with the side walls of the center tunnel. This measure ensures an especially good supporting effect because the center tunnel is also used to reinforce the support of the seat backs of the front seats against one another.

Other objects, advantages and novel features of the present invention will become apparent from the following detailed description of the invention when considered in conjunction with the accompanying drawings.

DETAILED DESCRIPTION OF THE INVENTION

Figure 1:
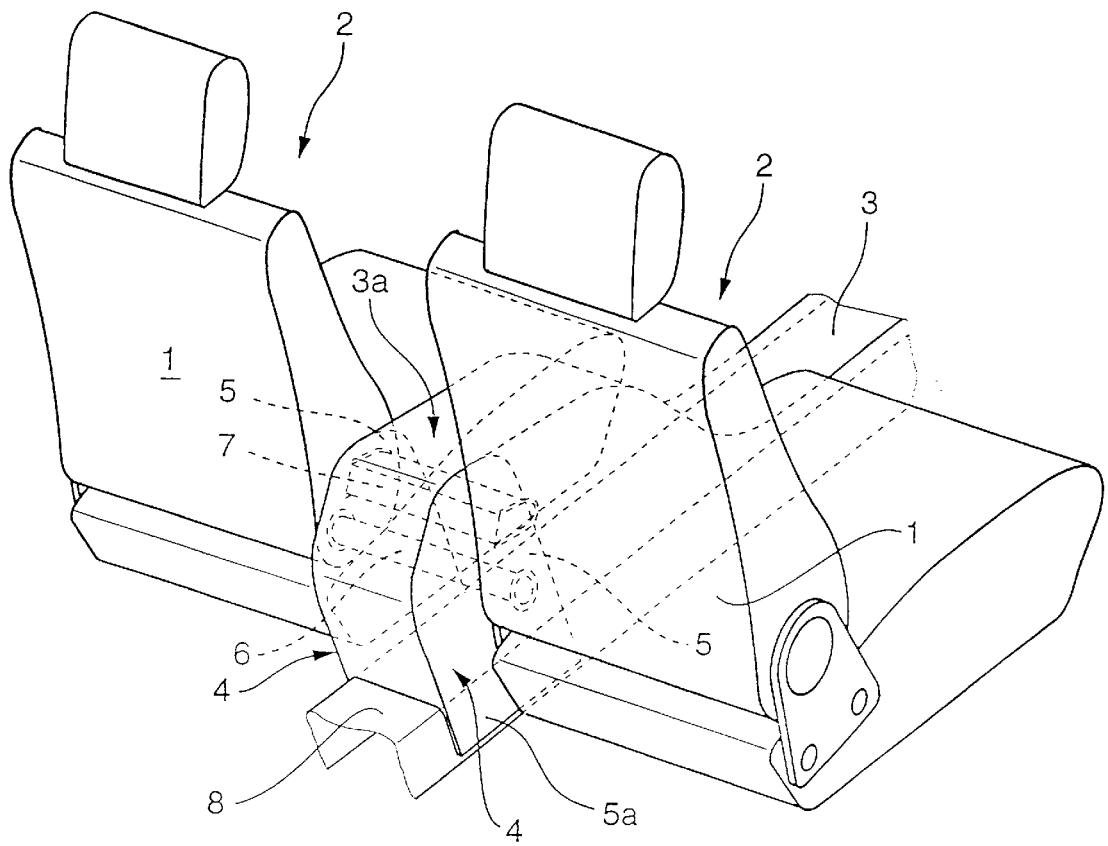
FIG. 1 is a schematic perspective drawing of the front seats of an automobile, with a center console located between them, constructed according to a preferred embodiment of the invention.

In FIG. 1, the two seat backs (1) of two front seats (2) are shown schematically, between which seats a center console (3) extends, said console extending in known fashion up to the front dashboard. Center console (3), in its area located between seat backs (1), assumes a box-shaped structure (3a) that extends upward, said structure serving firstly in known fashion to receive storage compartments shown in FIGS. 2 and 3, but serving primarily as a supporting element between seat backs (1), which as a result, in the event of a lateral impact on the vehicle, are prevented from tilting against one another and into the vehicle interior.

For this purpose, as shown schematically, each of the two side walls (4) of box-shaped area (3a) of center console (3) is provided with a reinforcing insert in the form of a lightweight metal shell (5), and these two lightweight metal shells (5) are connected together by cross braces (6 and 7) to form a supporting supporting element located between seat backs (1) and overlap their adjusting area approximately. Supporting element (6) is then designed as a continuous supporting tube that abuts lightweight metal shells (5). Supporting element (7) is likewise designed as a type of hollow beam whose exact structure however is better shown in detail in FIG. 2. Both supporting elements (6 and 7) are arranged so that they are located in the separating area between the storage compartments that can be located in box-shaped area (3a) or in the portion of center console (3) located ahead of said area. The lightweight metal shells (5) of the side walls of box-shaped area (3a) also have their areas (5a) extending downward over the structural element that is placed on a center tunnel (8) of the vehicle, and are connected with the side walls of center tunnel (8).

Figure 2:
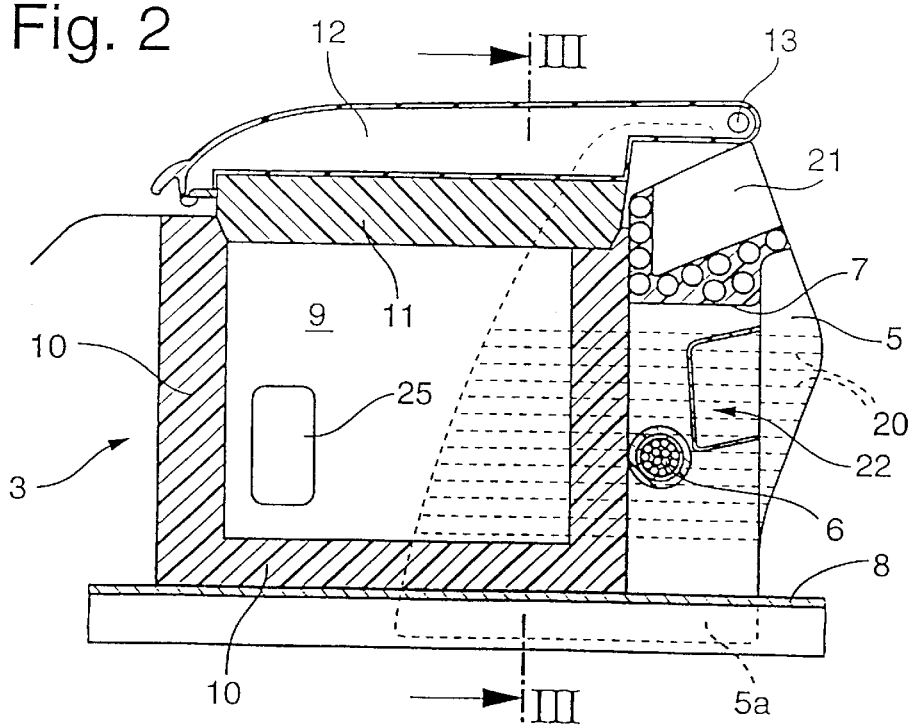
FIG. 2 is a section through a central plane of the console according to FIG. 1.
Figure 3:
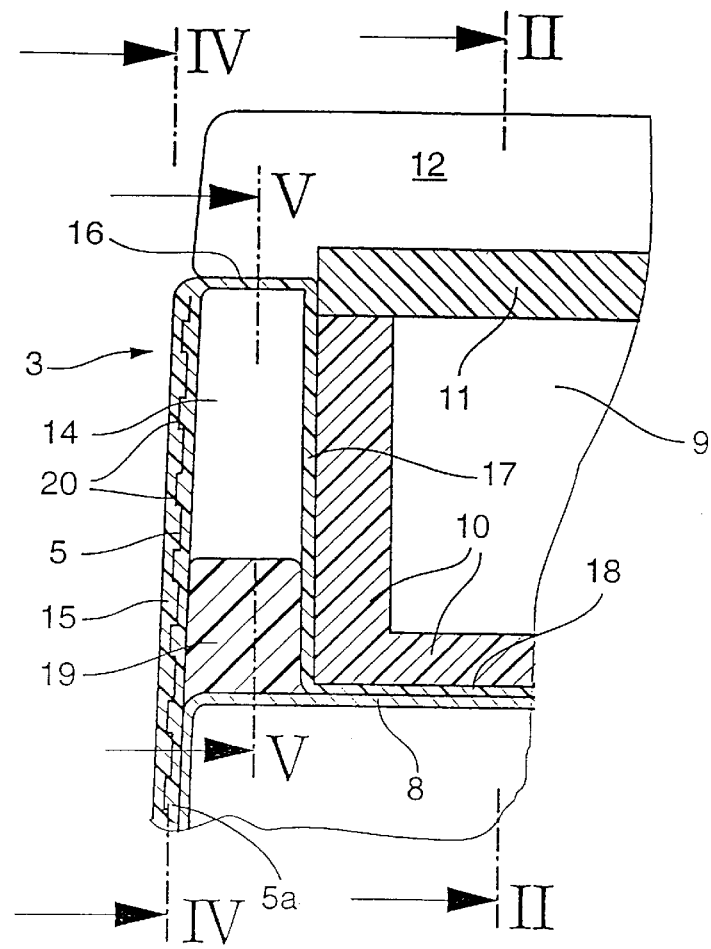
FIG. 3 is a partial cross section through the center console of FIG. 2 along line III—III.
Figure 4:
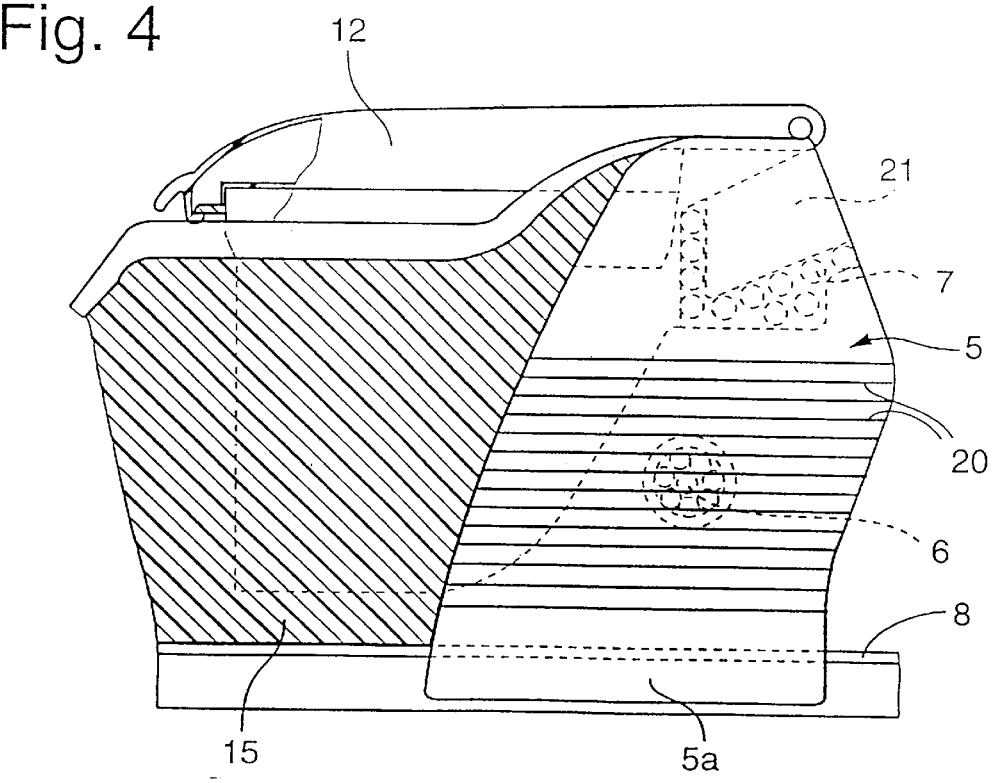
FIG. 4 is a lengthwise section similar to FIG. 2 but along sectioning plane IV—IV in FIG. 3.

It is clear from FIG. 2 that a central storage compartment (9) is located in center console (3), said compartment in this embodiment being covered by inserted foam walls (10) and by foam insulation (11) provided on the underside of a lid (12) that can be raised by a hinge (13). This central storage compartment (see also FIG. 3) is delimited on both sides by hollow spaces (14) formed by virtue of the fact that outside wall (15) provided with lightweight metal shells (5), said outside wall consisting of impact-resistant plastic, in which the lightweight metal shell (5) is embedded, makes a transition through an upper connecting piece (16) to an inside wall (17) that extends up to bottom (18) of console (3). Console (3) rests on center tunnel (8) by this bottom (18). The hollow spaces (14) which are then open at the bottom are closed off at the bottom by inserted foam bodies (19), whose design can be seen in FIG. 5. This double-walled structure lends the center console a good degree of strength which is even further improved, primarily in the lateral areas, by the inserted lightweight metal shells (5). FIGS. 2 and 4 show that these lightweight metal shells (5) (see also FIG. 3) are equipped with reinforcing ribs (20) that face hollow space (14), said ribs also optionally being complemented by ribs that run crosswise but are not shown, to form a honeycomb structure, to increase stability.

FIG. 2 shows that beam-type reinforcing elements (6 and 7) each extend in areas where the separation between central storage compartment (9) and an upper storage compartment (21) or a built-in compartment (22) located further down is provided. The two storage compartments (21 and 22) open to the rear, into the back seat compartment.

Hollow spaces (14) in the embodiment shown form air ducts delimited at the bottom by inserted foam bodies (19). Foam bodies (19) have a greater height in their rear areas so that the air duct leads upward to an air outlet nozzle (23) located in area (3a). The air duct is limited at the top by wall (16) which, together with inserted foam bodies (19), forms an S—shaped surface in order to ensure air guidance along arrows (24) from the ventilation device, not shown, located in the forward part of the vehicle, to outlet nozzle (23).

Figure 5:
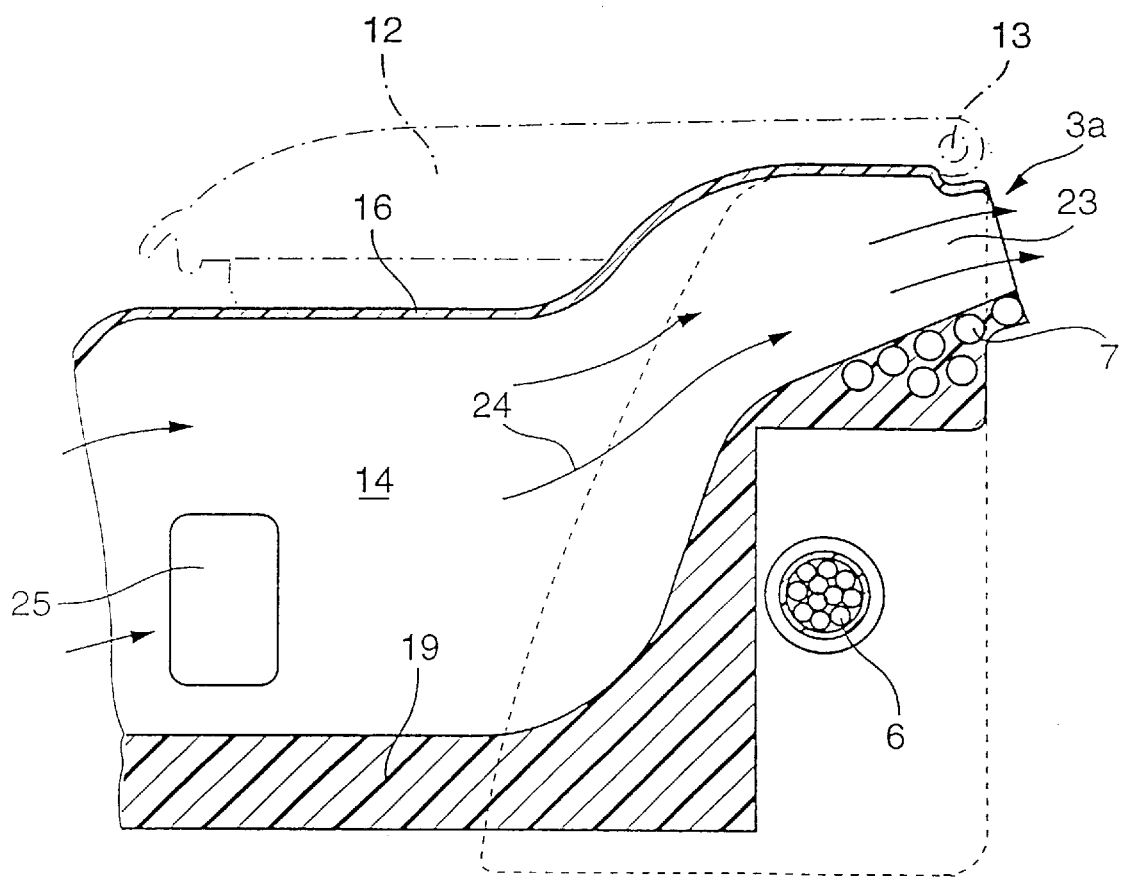
FIG. 5 is a lengthwise section similar to FIG. 4 but along sectioning plane V—V in FIG. 3.

FIG. 5 shows (as does FIG. 2) that in inside wall (17) of air duct (14), and of course also in molding (10) located therein, a window (25) is provided which thus creates a connection between air duct (14) and central storage compartment (9). Air-conditioned, especially cooled air, can therefore reach central storage compartment (9) which, since it is lined by insulation, can serve advantageously as a cooling compartment.

As a result of the design according to the invention, an area is created between backs (1) of the front seats which, in addition to serving to accommodate assemblies or storage compartments, also can serve as a supporting element for the seat back braces, not shown. This design makes a key contribution to increasing the safety of the passengers riding in the front seats.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Center console assembly for a passenger motor vehicle having a pair of spaced apart front seats which each have seat backs with seat back side walls facing respective opposite lateral sides of a center console, comprising:
   a plurality of vertically spaced hollow beam cross braces extending between opposite lateral sides of the center console and serving to transfer lateral impact forces on the vehicle between the respective seat backs.

2. Center console assembly according to claim 1, wherein the lateral sides of the center console are formed with console side walls, and
   wherein the side walls are reinforced by lightweight metal shells.

3. Center console assembly according to claim 2, wherein the lightweight metal shells are made slightly convex and are provided with reinforcing ribs on their inwardly directed areas.

4. Center console according to claim 2, wherein the lightweight metal shells are embedded in impact-resistant plastic of the console side walls.

5. Center console assembly according to claim 1, wherein the center console includes a central storage compartment surrounded laterally by hollow spaces.

6. Center console assembly according to claim 5, wherein the hollow spaces are designed as air ducts to supply an outlet nozzle located at the center console.

7. Center console assembly according to claim 6, wherein the hollow spaces are downwardly open, and
   wherein the air ducts are closed off by foam bodies inserted under the hollow spaces at the bottom.

8. Center console assembly according to claim 7, wherein the foam bodies are designed as deflecting walls to guide air.

9. Center console assembly according to claim 5, wherein walls of the hollow spaces facing the central storage compartment are provided with windows.

10. Center console assembly according to claim 2, wherein a center tunnel is provided, and wherein the console side walls reinforced by the lightweight metal shells extend downward beyond box-shaped area of the console and are permanently connected with side walls of the center tunnel.

11. Center console assembly according to claim 1, wherein said console includes at least one front storage compartment accessible to front seat passengers and at least one rear storage compartment accessible to rear seat passengers disposed behind the front seats.

12. Center console assembly according to claim 11, wherein the hollow beam cross braces are disposed between the at least one front storage compartment and the at least one rear storage compartment.

13. Center console assembly according to claim 12, wherein the hollow beam cross braces are disposed vertically spaced from one another.

14. Center console assembly according to claim 1, wherein a central tunnel with tunnel side walls is provided, and wherein the lateral side walls extend downwardly adjacent the tunnel side walls and are fixed securely thereto.

15. Center console assembly according to claim 13, wherein a central tunnel with tunnel side walls is provided, and wherein the lateral side walls extend downwardly adjacent the tunnel side walls and are fixed securely thereto.

16. Center console assembly for a passenger motor vehicle having a pair of spaced apart front seats which each have seat backs with seat back side walls facing respective opposite lateral sides of a center console, comprising:

at least one hollow beam cross brace extending between opposite lateral sides of the center console and serving to transfer lateral impact forces on the vehicle between the respective seat backs, wherein the lateral sides of the center console are formed with console side walls, wherein the side walls are reinforced by lightweight metal shells, and wherein the lightweight metal shells are made slightly convex and are provided with reinforcing ribs on their inwardly directed areas.

17. Center console assembly for a passenger motor vehicle having a pair of spaced apart front seats which each have seat backs with seat back side walls facing respective opposite lateral sides of a center console, comprising:

at least one hollow beam cross brace extending between opposite lateral sides of the center console and serving to transfer impact forces on the vehicle between the respective seat backs, wherein the center console includes a central storage compartment surrounded laterally by hollow spaces, wherein the hollow spaces are designed as air ducts to supply an outlet nozzle located at the center console, wherein the hollow spaces are downwardly open, and wherein the air ducts are closed off by foam bodies inserted under the hollow spaces at the bottom.

18. Center console assembly according to claim 17, wherein the foam bodies are designed as deflecting walls to guide air.

19. Center console assembly for a passenger motor vehicle having a pair of spaced apart front seats which each have seat backs with seat back side walls facing respective opposite lateral sides of a center console, comprising:

at least one hollow beam cross brace extending between opposite lateral sides of the center console and serving to transfer lateral impact forces on the vehicle between the respective seat backs, wherein the center console includes a central storage compartment surrounded laterally by hollow spaces, and wherein walls of the hollow spaces facing the central storage compartment are provided with windows.

20. Center console assembly for a passenger motor vehicle having a pair of spaced apart front seats which each have seat backs with seat back side walls facing respective opposite lateral sides of a center console, comprising:

at least one hollow beam cross brace extending between opposite lateral sides of the center console and serving to transfer lateral impact forces on the vehicle between the respective seat backs, wherein a central tunnel with tunnel side walls is provided, and wherein the lateral sides of the center console extend downward adjacent the tunnel side walls and are fixed securely thereto.

21. Center console assembly according to claim 20, wherein the lateral sides of the center console are formed with console side walls, and wherein the console side walls are reinforced by lightweight metal shells.

* * * * *